United States Patent [19]

Cline et al.

[11] Patent Number: 5,550,970
[45] Date of Patent: Aug. 27, 1996

[54] METHOD AND SYSTEM FOR ALLOCATING RESOURCES

[75] Inventors: Troy L. Cline, Cedar Park; Scott H. Isensee, Georgetown; Ricky L. Poston, Austin, all of Tex.

[73] Assignee: International Business Machines Corporation, Armonk, N.Y.

[21] Appl. No.: 298,880

[22] Filed: Aug. 31, 1994

[51] Int. Cl.$^6$ .................................................... G06F 3/14
[52] U.S. Cl. .......................................... 395/161; 395/155
[58] Field of Search ....................... 395/155, 161, 395/650, 800, 700; 364/401, 402, 578

[56] References Cited

U.S. PATENT DOCUMENTS

| | | | |
|---|---|---|---|
| 5,006,978 | 4/1991 | Neches | 395/650 |
| 5,027,271 | 6/1991 | Curley et al. | 364/200 |
| 5,050,070 | 9/1971 | Chastain et al. | 364/200 |
| 5,193,189 | 3/1993 | Flood et al. | 395/650 |
| 5,210,872 | 5/1993 | Ferguson et al. | 395/650 |
| 5,255,211 | 10/1993 | Redmond | 364/578 |
| 5,369,570 | 11/1994 | Parad | 364/401 |
| 5,428,782 | 6/1995 | White | 395/650 |

OTHER PUBLICATIONS

A. Sekino, "A Note on Biased Resource Allocation", IBM Research Disclosure #4391, Jun. 29, 1973, 10 pages.
A. Sekino, "Optimal Allocation of Memory Space and Processor Time on Multiprogrammed Virtual Memory Computers", IBM Research Disclosure #4317, Apr. 17, 1973, 34 pages.

*Primary Examiner*—Mark R. Powell
*Assistant Examiner*—Ruay Lian Ho
*Attorney, Agent, or Firm*—Diana L. Roberts

[57] ABSTRACT

A method and system for allocating at least one resource among a plurality of processes. The method includes the computer-implemented steps of displaying a representation of a proportion of the resource that is allocated to a first process on a display and, in response to manipulating the representation, dynamically changing the proportion of the resource that is allocated to the first process.

24 Claims, 4 Drawing Sheets

METHOD AND SYSTEM FOR ALLOCATING RESOURCES

BACKGROUND OF THE INVENTION

1. Field of the Invention

The present invention relates to allocating resources and, more particularly, to a graphical interface technique that enables efficient allocation of resources.

2. Background Information and Description of the Related Art

In today's computing and business environment, there is often a need to allocate resources among multiple, related variables. For example, a user may desire to control the proportion of processor time allocated to each of several concurrently running programs. Another example may involve allocating or reallocating hard disk space to various file systems. If the user adds additional resources to an existing computer system, those additional resources must be allocated.

Some conventional operating systems, such as Apple's Macintoshe™, have commands that invoke controls to view and manually reallocate RAM or hard disk space for various processes. For example, to reallocate RAM space, the user must manually enter a different allocation value for each process into a text field that is displayed in the RAM control. As a result, the user must mentally keep track of the total remaining RAM space so that it may be properly allocated among the remaining processes. Furthermore, if the user makes a reduction in available RAM space for one process, the user must remember the amount reduced and then properly redistribute that amount to the other processes.

Using a similar procedure, the AIX™ operating system allows a user to manually allocate segments of hard disk space to various file systems. Again, however, if the user makes a reduction in available hard disk space for one file system, the user must remember the amount reduced and then properly redistribute that amount to the other file systems.

As can be seen, conventional procedures for allocating/ reallocating resources are cumbersome, non-user friendly, and error prone. Accordingly, there is a need for a graphical user interface (GUI) that provides for a visual representation and manipulation of allocated resources.

SUMMARY

It is an object of the present invention to provide a method and system for allocating at least one resource among a plurality of processes. In a first embodiment, the method includes the computer-implemented steps of displaying a representation of a proportion of the resource that is allocated to a first process on a display and, in response to manipulating the representation, dynamically changing the proportion.

In a second embodiment, the method includes the steps of displaying a plurality of representations on a display, each representation depicting a proportion of the resource that is allocated to one of the processes. In response to manipulating one of the representations, the method includes the steps of dynamically changing a first proportion of the resource that is allocated to a first process, calculating a second proportion of the resource that is not allocated to the first process, and distributing the second proportion of the resource among the remaining processes according to a distribution proportion.

The apparatus includes a display for displaying a representation of at least a first proportion of the resource that is allocated to a first process and means for dynamically changing the first proportion in response to manipulating the representation.

DETAILED DESCRIPTION OF THE PREFERRED EMBODIMENT

The following detailed description is of the best presently contemplated mode for carrying out the invention. This description is not to be viewed in a limiting sense, but is made merely for the purpose of illustrating the general principles of the invention, the scope of which is only defined by the appended claims.

Figure 1:
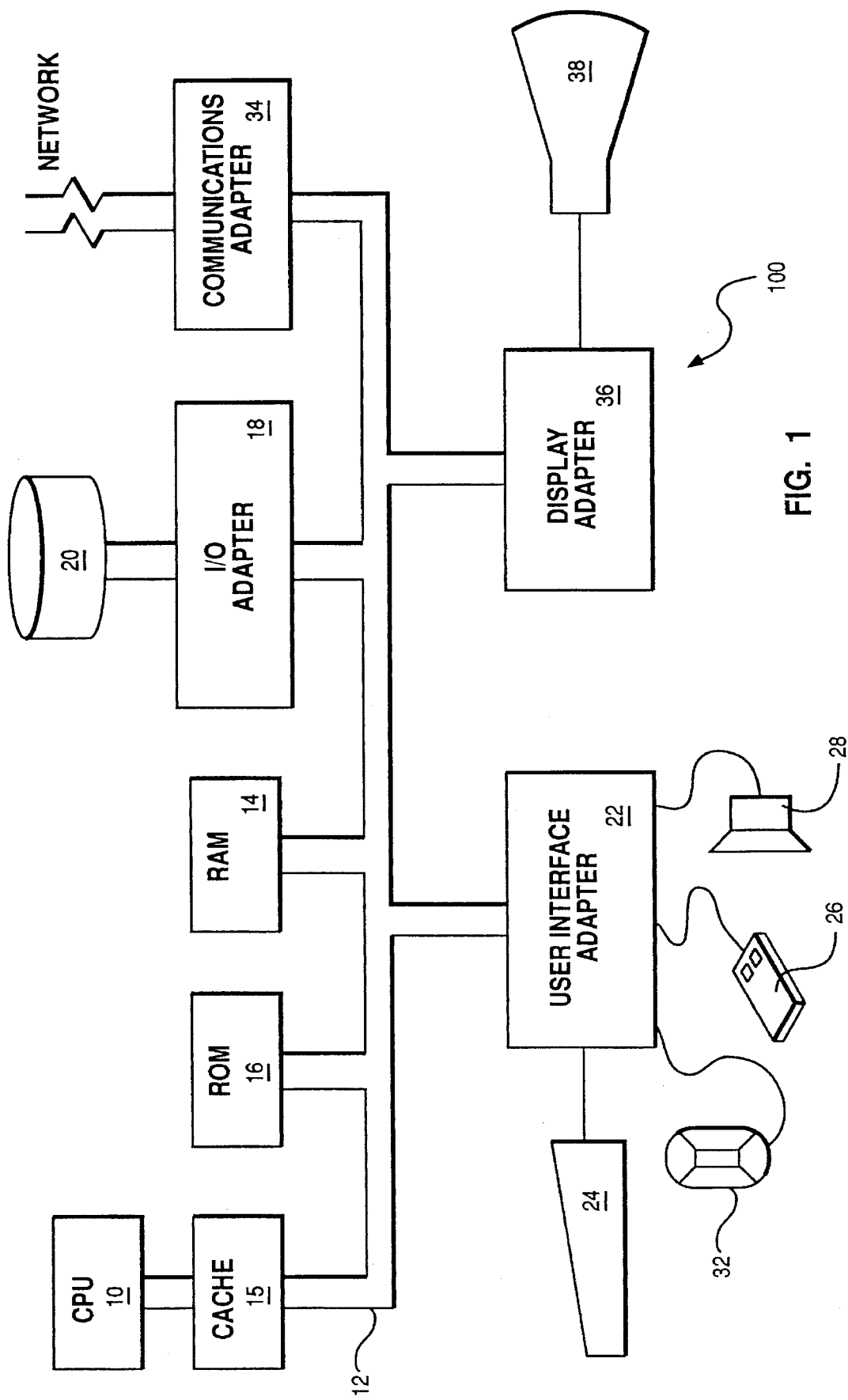
FIG. 1 illustrates a suitable representative hardware configuration in accordance with the present invention.

The preferred embodiment is preferably practiced in any suitable hardware configuration, such as a laptop computer. However, FIG. 1 illustrates one suitable hardware configuration. Workstation 100 includes any suitable central processing unit 10, such as a conventional microprocessor, and a number of other units interconnected via system bus 12. Illustratively, workstation 100 includes random access memory (RAM) 14, cache 15, read only memory (ROM) 16, display adapter 36 for connecting system bus 12 to display device 38, and I/O adapter 18 for connecting peripheral devices (e.g. disk and tape drives 20) to system bus 12.

Workstation 100 further includes user interface adapter 22 for connecting keyboard 24, mouse 26, speaker 28, microphone 32, and/or other user interface devices, such as a touch screen device (not shown), to system bus 12. Communication adapter 34 connects workstation 100 to a data processing network. Any suitable operating system may direct the operation of workstation 100, such as the Macintosh™ operating system, IBM's OS/2™, or Microsoft's Windows™. However, in the preferred embodiment, the AIX™ operating system controls workstation 100.

The preferred embodiment includes a graphical user interface (GUI) which resides within a machine-readable media to interface between the user and the operating system. Any suitable machine-readable media may retain the GUI, such as RAM 14, ROM 16, a magnetic diskette, magnetic tape, CD-ROM, or optical disk (the last four being located in disk and tape drives 20). The GUI controls and directs the operating system which, in turn, controls and directs CPU 10 to efficiently allocate resources. For ease of explanation, the following specification describes the GUI as performing the tasks necessary to allocate resources. In actuality, the GUI merely interfaces with the operating system to control and direct CPU 10 to perform those tasks.

Operating system manufacturers have developed various types of GUI desktops. GUI desktops use operating system commands and graphical representations to give the user manageable, user-friendly access to the operating system. In IBM's AIX™ the GUI desktop is stored in one file system of the operating system. A user typically interfaces with the GUI desktop using a pointing device, such as a mouse, and a keyboard. In turn, the mouse controls a software pointer (e.g. mouse cursor) that appears on a display of the computer system. The mouse cursor is used to manipulate various elements on the display, such as objects.

An object is a software component of the GUI that can be manipulated as a single unit to perform a task. Objects contain collections of procedures and/or data and can be grouped into classes. All objects of the same class are identical in form and behavior, but have different data associated therewith. Objects often appear as icons on the display.

Figure 2:
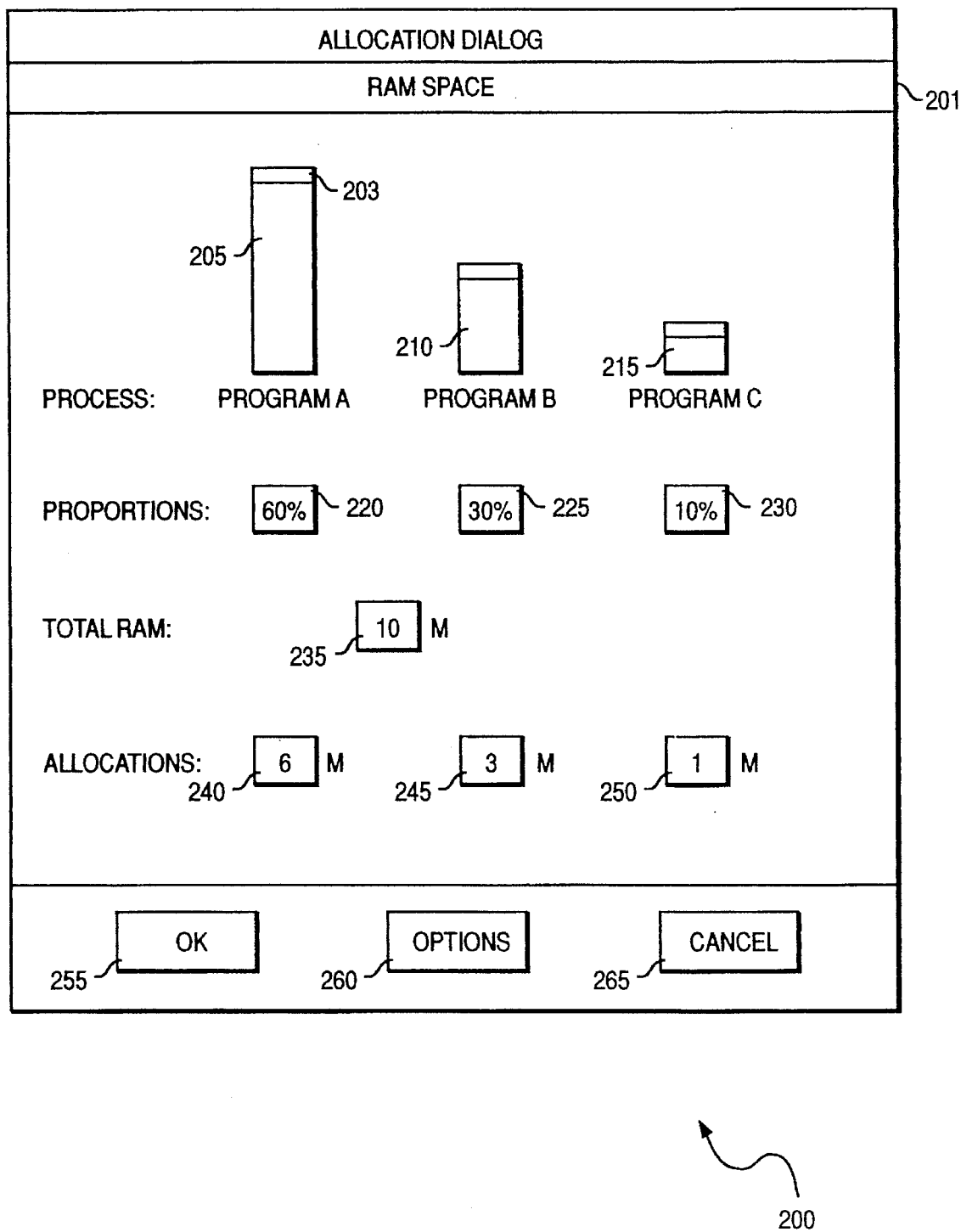
FIG. 2 illustrates a pictorial view of an allocation dialog for changing the allocation of resources in accordance with the present invention.

FIG. 2 is a pictorial view of allocation dialog 200. The user invokes this dialog by using the same preliminary command that he/she would use to manually invoke a resource interface. For example, to manually allocate RAM in the Macintosh operating system, the user invokes a RAM control panel by clicking on a RAM control panel icon (not shown). The user can allocate portions of RAM to cache memory and virtual memory. Applications provide dialogs to set their memory requirements individually. Similarly, in the AIX operating system, the user invokes a hard disk space menu dialog by typing "smit" at the command line. The operating system searches a database for allocation information about the hard disk and then presents the amount of hard disk space (e.g. the resource) used by each process (e.g. file system) and the amount of total available hard disk space.

However, in both of these examples, the user must type in numeric values to change allocations and then manually edit the other numeric fields for other processes that share that resource to ensure the correct total value is maintained.

In the preferred embodiment, the user uses the same invocation technique as described above. However, the GUI searches a database in the operating system for the particular resource, retrieves the pertinent information (e.g. allocation information) from that database, and then displays that information in a graphical form in allocation dialog 200 (described in more detail herein). Label 201 indicates which resource is being allocated.

In one example, allocation dialog 200 graphically displays bar controls 205, 210, and 215 (e.g. also referred to as "representations"), which define the allocation percentages of total available RAM space occupied by three currently running programs A, B, and C. Alternately, any form of graphical representation could be used in place of the bar controls, such as a pie chart representation. If no programs were currently running, then no bar icons would be displayed. Total RAM space field 235 indicates that there is approximately 10 megabytes of available RAM space, exclusive of the RAM space occupied by the operating system. Alternately, an additional bar could be displayed to show the percentage of RAM space currently being used by the operating system.

According to proportion fields 220, 225, and 230, program A occupies approximately 60% of available RAM space, program B occupies 30%, and program C occupies 10% Allocation fields 240, 245, and 250 each illustrate the exact amount of RAM space located in absolute measurement units/megabytes to its respective process. Using a mouse cursor, the user may grab drag handle 203 at the top of any one of the bar controls and drag it up or down to change the height of that bar control, thereby increasing or decreasing the RAM space allocation for the bar control's assigned process.

For example, the user could increase or decrease the amount of RAM space allocated to program A by placing the mouse cursor over the drag handle 203 of bar icon 205, holding the left mouse button down, moving the mouse upward or downward as appropriate to increase or decrease the vertical length of bar control 205, and then releasing the mouse button to set the allotment. The user may cancel those changes and exit allocation dialog 200 by clicking cancel button 265. Alternatively, the changes would be stored in the database for the particular resource when the user clicked OK button 255.

By changing the RAM allotment for program A, the allocated RAM space for programs B and C, depicted in bar icons 210 and 215, would automatically increase or decrease according to a predefined distribution proportion. Initially, the GUI automatically sets the distribution proportion to an equal ratio among all remaining processes. Alternately, defaults other than an equal ratio may also be used. For example, if the RAM space allocated to program A was decreased by 50% (i.e. 3 megabytes), those three megabytes would be equally distributed (i.e. 1.5M each) to programs B and C. However, the user can change the predefined distribution proportion using properties dialog 300, shown in FIG. 3.

Figure 3:
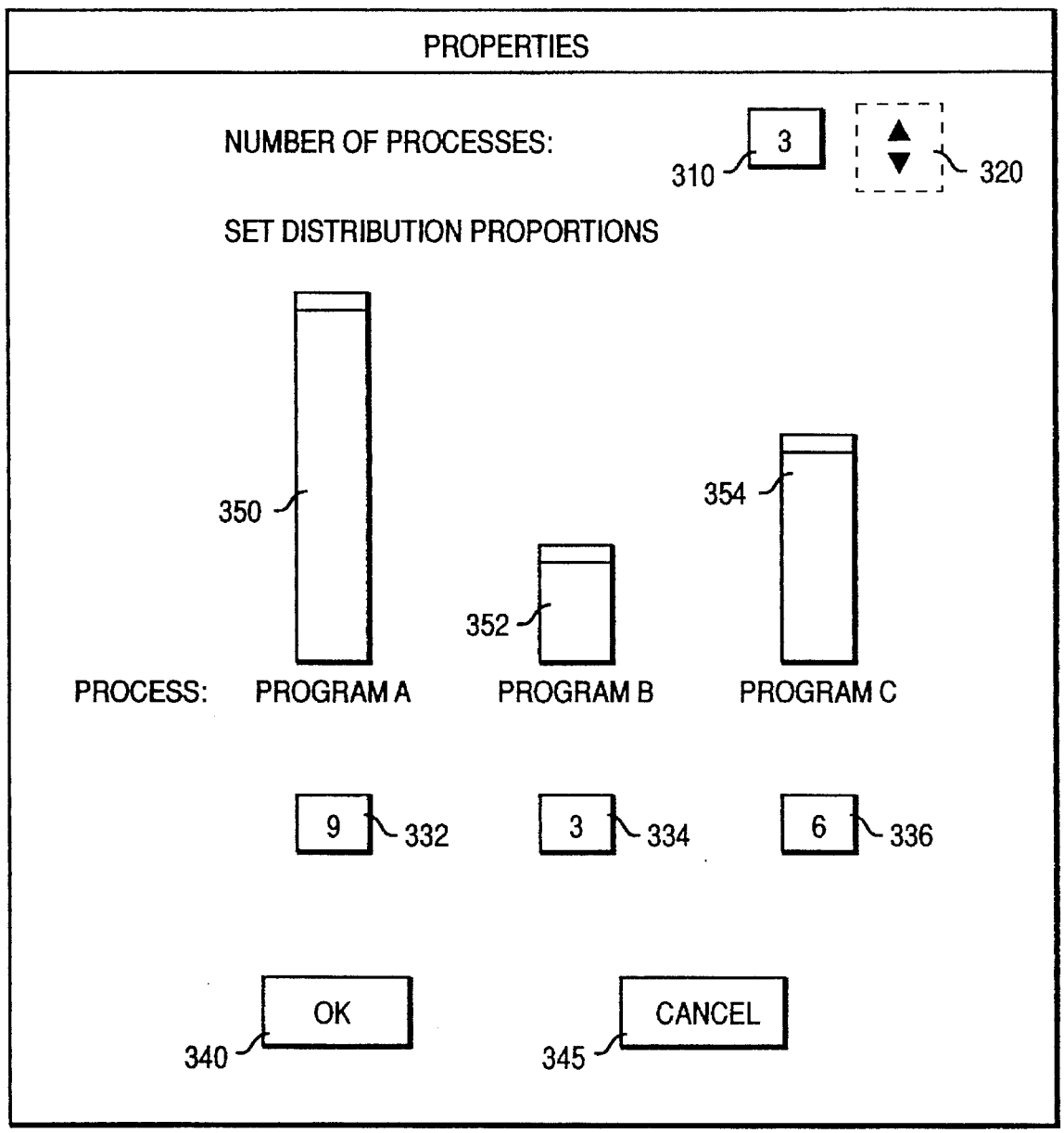
FIG. 3 illustrates is a pictorial view of a properties dialog for changing the distribution proportion of processes in accordance with the present invention.

FIG. 3 is a pictorial view of properties dialog 300. The user invokes this dialog by clicking options button 260 of allocation dialog 200. The GUI initially presents the processes (i.e. programs A, B, and C), previously illustrated in FIG. 2, in a scaled bar control format (e.g. generically referred to as "images"). The process number field 310 appropriately indicates that three processes are being considered. However, if the user desires to run additional or fewer processes in the future, he/she may add or delete bar controls (e.g. images) by clicking (using the mouse) either up or down arrows 320, respectively. If the user added a fourth process, an additional bar control would be displayed with a name field (not shown) positioned directly below the bar control so that the user could enter the name of that process. Therefore, if the fourth program ran at a later time, the operating system would known how much RAM space to allocate to that program. If the user clicked down arrow 320, then the user would position and activate the mouse cursor over one of proportion fields 332, 334, or 336 to delete that process.

The three processes would initially each be allocated equal proportions of RAM space. Therefore, proportion fields 332, 334, and 336 would each indicate a number 1 and bar icons 350, 352, and 354 would all be of the same height. It is important to note that these numbers are proportional relative values and do not represent real absolute units of measurement for the resource. In this example, the user has changed those proportional relative values to 9, 3, and 6, respectively, by dragging the drag handle for each bar up or down until the desired value appears in the proportion field below the bar or, alternatively, by simply clicking the mouse cursor over the appropriate field to activate it, and then typing in the desired value. Upon clicking OK button 340, those ratios are stored in a database in the GUI for those particular processes.

Using the above example and referring also to FIG. 2, if the user decreases the amount of RAM space for program A by 3 megabytes, those three additional megabytes are reallocated according to proportion fields 334 and 336. The GUI uses a simple formula to calculate the change in RAM allotment for programs B and C as. follow:

| | |
|---|---|
| Allotment Prog. B | = B ratio * amount to be redistributed |
| | = B ratio * 3 megabytes |
| | = B/(B+C) * 3 megabytes; |
| | = 3/(3+6) * 3 megabytes |
| | = 1M |
| Allotment Prog. C | = C ratio * amount to be redistributed |
| | = C/(B+C) * 3 megabytes |
| | = 6/(3+6) * 3 megabytes |
| | = 2M |

As such, program B would be allotted 1 additional megabyte of RAM space and program C would be allotted 2 additional megabytes of RAM space.

If three megabytes were added to program A, then the following formula is used to calculate a reduction:

| | |
|---|---|
| Reduce B = | − [C ratio * amt. redistributed to Prog. A] |
| | = − [C/(B+C) * 3 megabytes] |
| | = − [6/(3+6) * 3 megabytes] |
| | = − 2M |
| Reduce C = | − [B ratio * amt. redistributed to Prog. A] |
| | = − [B/(B+C) * 3 megabytes] |
| | = − [3/(3+6) * 3 megabytes] |
| | = − 1M |

As such, the allotment for program B would be reduced by 2 megabytes and the allotment for program C would be reduced by 1 megabyte. Additional processes could easily be added to the formula (e.g. B/(B+C+D)).

Figure 4:
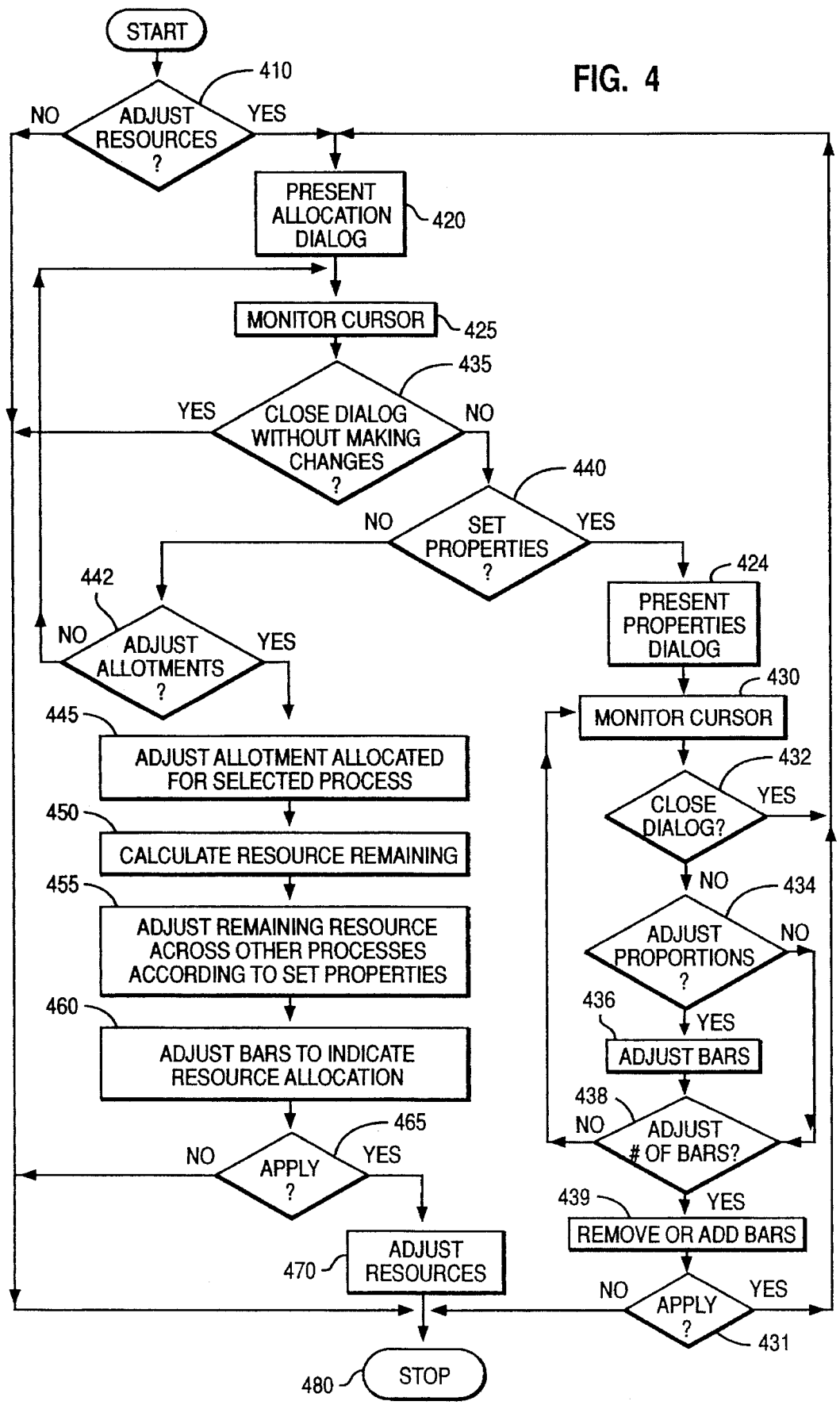
FIG. 4 illustrates a flowchart of detailed logic for allocating resources in accordance with the present invention.

FIG. 4 illustrates a flowchart of detailed logic for allocating a particular resource. Referring to FIGS. 2, 3, and 4, at 410, the GUI determines if a command has been entered by the user to adjust the allotment of resources. Alternatively, the GUI could monitor the position of the mouse cursor to determine if it has been positioned and activated over an allocation icon (not shown) for a particular resource. If not, control is directed to 480.

If so, at 420, depending on the resource, the GUI transmits operating system commands to the operating system to initiate a search of a particular database in the operating system. This database contains the total amount of available resource, if any, and the amount of resource currently allocated for various process(es). Illustratively, when the user installs the AIX operating system, it typically segments the hard disk(s) into space for user storage, space for the operating system itself, printing storage, etcetera, and stores this information in a database. Therefore, for this example, at 420, the GUI would retrieve the segment information from the database and then display one bar control for each allocated process (e.g. segment) in allocation dialog 200.

At 425, the GUI monitors the mouse cursor. At 435, the GUI determines if the mouse cursor has been positioned and activated over cancel button 265. If so, control passes to 480 and the process terminates. At 435, the GUI determines if the mouse cursor has been positioned and activated over options button 260. If so, at 424, the GUI displays the properties dialog 300. If not, at 442, the GUI monitors the position of the mouse cursor to determine if the user is attempting to adjust the allocation of resources. If not, control returns to 425.

As previously described, the user can increase or decrease the amount of RAM space allocated to, for example, program A by placing the mouse cursor over drag handle 203 of bar control 205, holding the left mouse button down, moving the mouse as appropriate to increase or decrease the vertical length of bar control 205, and then releasing the mouse button to set the allotment. At 455, the GUI adjusts the allotment of the resource for the selected process in accordance with movements of the mouse cursor.

At 450, the GUI calculates the remaining available resource. Using the previously described formula, at 455, the GUI distributes any remaining available resource to the other processes in accordance with a defined ratio between those remaining processes. At 460, the GUI adjust the bar icons for the remaining processes appropriately. At 465, the GUI determines if the mouse cursor has been positioned and activated over OK button 255. If so, the GUI stores any changes in resource allotment in the database for that resource. If the GUI detects activation of the cancel button 265, the GUI discards any changes and control returns to 480.

At 424, the GUI displays the properties dialog 300. At 430, the GUI monitors the position of the cursor. At 432, the GUI determines if the mouse cursor has been positioned and activated over cancel button 345. If so, control returns to 420. If not, at 434, the GUI monitors the position of the mouse cursor to determine if the user is attempting to adjust the distribution proportions of each process. As previously described, the user changes the proportions by simply clicking the mouse cursor over the desired proportion field to activate it, and then typing in the desired value. At 436, the GUI adjust the bar controls according to any changes made by the user.

At 438, the GUI determines if the mouse cursor has been positioned and activated over process number field 320. If so, at 439, the GUI adds or deletes the appropriate number of bar controls. If not, control returns to 430. At 431, the GUI determines if the mouse cursor has been positioned and activated over cancel button 345 or OK button 340. If over OK button 340, any changes made are stored in the database for the particular resource and control returns to 420. If over cancel button 345, the process terminates at 480.

The following code illustrates the above description:

```
While the resource control panel has been activated;
{
    Retrieve attributes of the resource from a
        database;
    Present those attributes, if any, in an
        allocation dialog;
    Monitor the location of the mouse cursor;
    {
        If cursor moves to cancel button
        {
            stop;
        If cursor moves to options button
        {
            display properties dialog;
            monitor cursor movement;
            make modifications, if any, to the
                distribution proportions among
                processes and/or number of icon
                bars;
            monitor location of cursor to either
                store the changes in the
                database and return to the
                allocation dialog or to exit;
        }
        If mouse cursor moves to top of an icon
            bar;
        {
            change icon bar vertically as mouse
                moves vertically;
            calculate the remaining resource
                available;
```

```
           distribute remaining resource across
              other remaining processes
              according to the set
              distribution proportion;
           adjust bar icons to indicate new
              resource allocation;
           monitor the location of the mouse
              cursor to either store the
              changes in the database or to
              exit;
        }
     }
  }
```

While the invention has been shown and described with reference to particular embodiments thereof, it will be understood by those skilled in the art that the foregoing and other changes in form and detail may be made therein without departing from the spirit and scope of the invention. For example, it should be understood that any resource could be allocated for any suitable process. Examples of allocatable resources could include microprocessor time, hard disk space, the number of employees allocated to various processes (e.g. jobs/tasks) and solids, gases, or liquids which are mixed according to various processes (e.g. formulas, recipes ).

What is claimed is:

1. A computer-implemented method for allocating the use of at least one resource in a computer system among a plurality of processes, comprising the steps of:

displaying on a computer display a representation of a first proportion of the resource that is allocated for use by a first process; and in response to manipulating the representation on the computer display by user controls, dynamically changing the first proportion allocated for use by the first process according to the manipulation of the representation.

2. The method according to claim 1 further comprising the steps of:

in response to the manipulation of the representation by user controls, calculating a second proportion of the resource that is not allocated to the first process; and automatically distributing the second proportion of the resource among the remaining processes according to a distribution proportion.

3. The method according to claim 2 further comprising the steps of:

displaying a plurality of representations on the computer display, each representation depicting a proportion of the resource that is allocated to one of the remaining processes; and changing the plurality of representations on the display in response to the changing of the first proportion and the distributing of the second proportion among the remaining processes.

4. The method according to claim 2 wherein the distributing step comprises the step of:

distributing the second proportion equally among the remaining processes.

5. The method according to claim 2 wherein the distributing step comprises the steps of:

concurrently displaying images on the display, each image representing the distribution proportion for one of the processes; and in response to manipulating at least a first image on the computer display by user controls, dynamically changing the distribution proportion of the process represented by the first image according to the manipulation of the first image.

6. The method according to claim 5 wherein each of the images comprises a bar graph.

7. The method according to claim 1 wherein the step of displaying a representation of the first proportion of the resource comprises the steps of:

retrieving allocation information for the resource from a database;

generating the representation from the allocation information; and displaying the representation on the computer display as a bar graph.

8. The method according to claim 7 wherein manipulating the representation comprises the step of:

in response to a command from user controls, increasing or decreasing the length of the bar graph to increase or decrease the first proportion.

9. The method according to claim 1 wherein the resource comprises RAM storage, microprocessor time, or hard disk space.

10. An apparatus, having at least a processor, memory, and user controls, for allocating at least one resource of a computer system for use by a plurality of processes, comprising:

a computer display for displaying a representation of at least a first proportion of the resource that is allocated for use by a first process; and means for dynamically changing the first proportion of the resource allocated to the first process in response to an amount of manipulation of the first representation by user controls.

11. The apparatus according to claim 10 further comprising:

means for calculating a second proportion of the resource that is not allocated to the first process; and means for distributing the second proportion of the resource among the remaining processes according to a distribution proportion.

12. The apparatus according to claim 11 wherein the means for distributing comprises:

means for distributing the second proportion equally among the remaining processes.

13. The apparatus according to claim 11 wherein the means for distributing comprises:

the computer display for concurrently displaying images, each image representing the distribution proportion for one of the processes; and in response to manipulating at least a first image by user controls, means for dynamically changing the distribution proportion of the process represented by the first image.

14. The apparatus according to claim 13 wherein each of the images comprises a bar graph.

15. The apparatus according to claim 10 wherein the means for displaying a representation of the first proportion of the resource comprises:

means for retrieving allocation information for the resource from a database in memory;

means for generating the representation from the allocation information; and the computer display for displaying the representation as a bar graph.

16. The apparatus according to claim 15 wherein manipulating the representation comprises:

the user controls for increasing or decreasing the length of the bar graph to increase or decrease the first proportion.

17. A computer-implemented method of allocating the use of at least one resource of a computer system among a plurality of processes operating on the computer system, comprising the steps of:

displaying a plurality of representations on a computer display, each representation depicting a proportion of the computer system resource that is allocated to one of the processes;

in response to manipulating one of the representations by user controls, dynamically changing a first proportion of the computer system resource that is allocated to a first process represented by the manipulated representation;

calculating a second proportion of the computer system resource that is not allocated to the first process; and distributing the second proportion of the computer system resource among the remaining processes according to a distribution proportion.

18. The method according to claim 17 further comprising the step of:

changing the plurality of representations on the display in response to the changing of the first proportion and the distributing of the second proportion among the remaining processes.

19. The method according to claim 18 wherein the distributing step comprises the step of:

distributing the second proportion equally among the remaining processes.

20. The method according to claim 18 wherein the distributing step comprises the steps of:

concurrently displaying images on the display, each image representing the distribution proportion for one of the processes; and in response to manipulating at least a first image, dynamically changing the distribution proportion of the process represented by the first image.

21. The method according to claim 20 wherein each of the images comprises a bar graph.

22. The method according to claim 18 wherein the step of displaying a plurality of representations on a display comprises the steps of:

retrieving allocation information for the resource from a database;

generating the representations from the allocation information; and displaying the representations on the display as bar graphs.

23. The method according to claim 22 wherein manipulating the first representation comprises the step of:

increasing or decreasing the length of one of the bar graphs to increase or decrease the first proportion.

24. An article of manufacture comprising:

a computer usable medium having computer readable program code means embodied therein for causing a computer to allocate the use of at least one resource of the computer among a plurality of processes, the computer readable program code means in the article of manufacture comprising:

computer readable program code means for causing the computer to display a representation of a first proportion of the resource that is allocated for use by a first process; and computer readable program code means for causing the computer to dynamically change the first proportion allocated for use by the first process in response to manipulating the representation on a computer display by user controls.

* * * * *